(No Model.)
2 Sheets—Sheet 1.
A. LINDENBERG.
WINDING APPARATUS FOR MINES.
No. 295,774.
Patented Mar. 25, 1884.
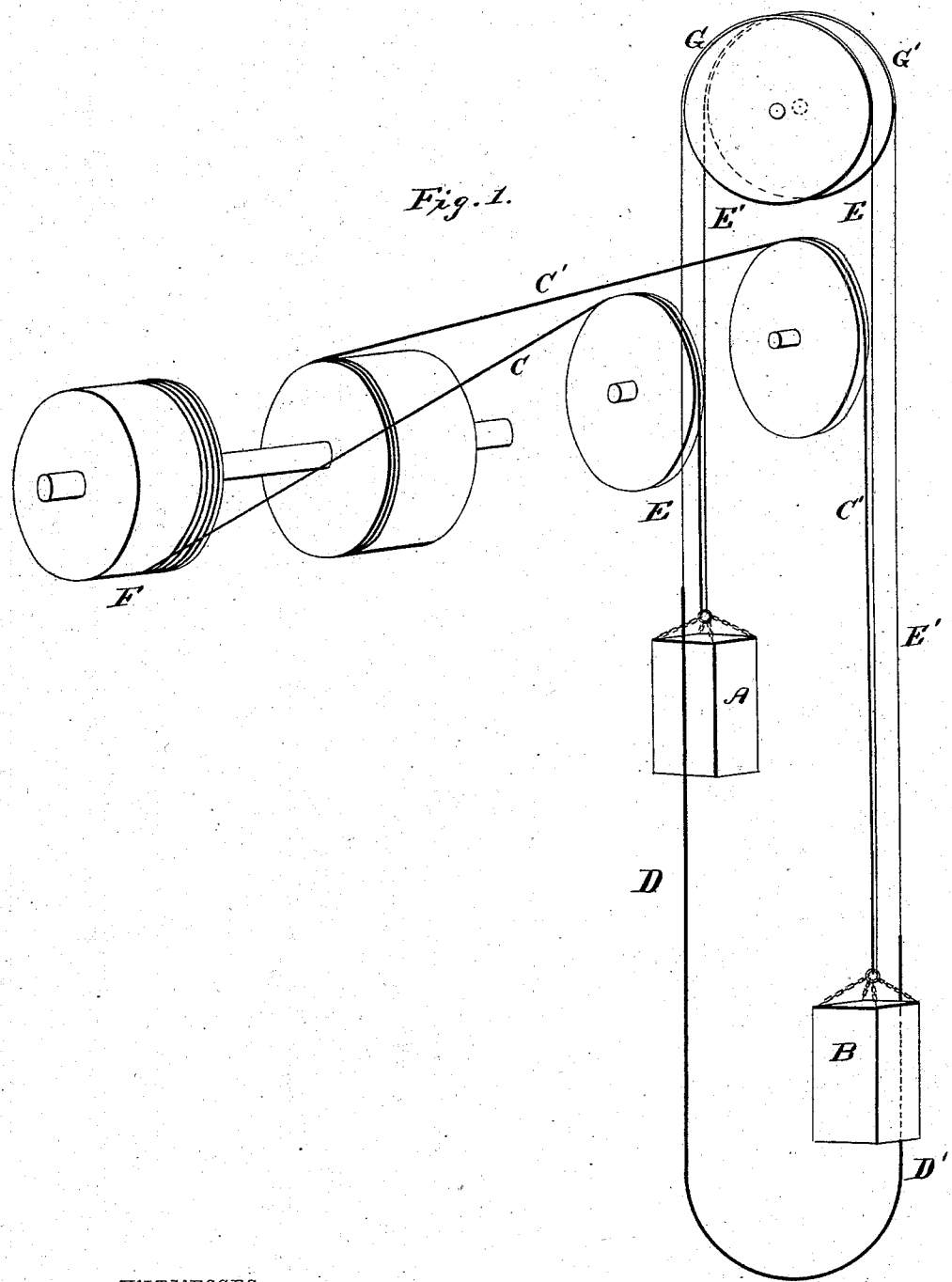
WITNESSES
Chas. R. Burr
J. Walter Blandford
INVENTOR
Arthur Lindenberg
by Marcellus Bailey
Attorney

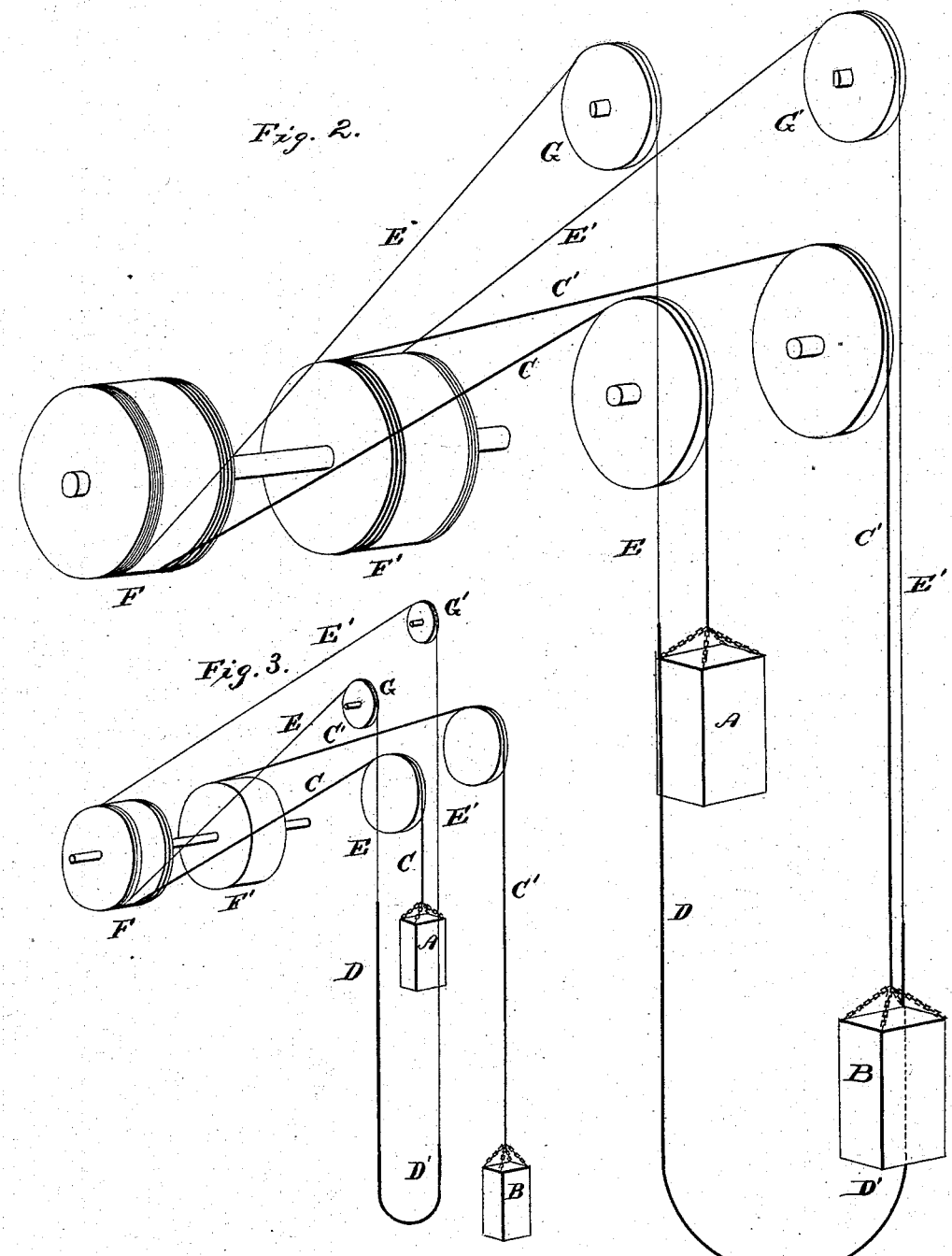

United States Patent Office.

ARTHUR LINDENBERG, OF DORTMUND, PRUSSIA, GERMANY.

WINDING APPARATUS FOR MINES.

SPECIFICATION forming part of Letters Patent No. 295,774, dated March 25, 1884.

Application filed January 28, 1884. (No model.)

*To all whom it may concern:*

Be it known that I, ARTHUR LINDENBERG, residing in Dortmund, Kingdom of Prussia, Germany, have invented new and useful Improvements in Winding Apparatus for Mines, of which the following is a specification.

My invention relates to winding apparatuses for mines in which counterbalance ropes or chains are used for equalizing the resistance encountered by the winding-engine during its operation. At present such counterbalance-ropes are attached with their ends to the bottom of the two cages, whereby their weight is thrown upon the winding-ropes, so as to lessen the security of the latter against breakage.

The object of my invention is to so combine the counterbalance rope or chain with the apparatus that its weight does not act upon the winding-rope.

The invention is represented on the annexed two sheets of drawings in perspective views and in three different modifications.

In all the figures, A and B are the two cages; C and C', the winding-ropes running over guiding-sheaves, as usual; and F and F', the winding-drums, while D D' is the counterbalance rope or chain.

According to Figure, 1 a thin rope, E, having sufficient strength to bear the weight of the counterbalance-rope D D', and which I shall call "suspension-rope," is attached to one end of the said rope D D' and conducted upward over a special independent guiding-sheave, G, arranged at a suitable height, and is from there passed downward parallel and close to the winding-rope C', to be finally connected to the top of the cage B. In like manner another suspension-rope, E', attached to the other end of the counterbalance-rope, is passed over another independent guiding-sheave, G', and down to the top of the cage A, to be fixed thereto. The two sheaves G and G' have to be so arranged that one part of either of the ropes E and E', when hanging plumb, coincides, nearly at least, with the vertical center line of either cage, while the other parts of the ropes E and E' keep the rope D D' to a sufficient extent clear of the cages. The rope D D' may, however, be close to the cages, and it may then be passed through guides attached thereto for the purpose of steadying it.

It will be seen that by the described arrangement of the ropes a portion of the weight of either cage—say, for instance, A—is balanced by the part D' of the rope D D', and that when A is lowered the said part D' will become longer in the same measure as the hanging part of the winding-rope C does. The consequence of this is, that while the load on the drum F becomes greater by the increase of length, and therefore of weight, of the hanging part of rope C, a proportionally greater portion of the weight of the cage A will be balanced by the rope part D', so that the resulting load on the drum F and the strain on the rope C will remain uniform. The same is of course the case with the drum F' and the rope C'.

In order to completely fulfill its purpose, the counterbalance-rope must be of a weight per lineal foot equal to the sum of the like weights of the winding-ropes and the suspension-ropes. A modification of this arrangement shown by Fig. 2 is as follows: The suspension-rope E, attached to the end of the counterbalance-rope part D, which rises and descends with the cage A, is carried over the guiding-sheave G, as before; but it is thence passed to the winding-drum for the cage A—*i. e.*, to the drum F—and is so fixed thereto that both the winding-rope C and the suspension-rope E will be coiled up or uncoiled simultaneously. In an analogous manner the suspension-rope E' from the part D' of the counterbalance-rope is conducted over the sheave G' to the winding-drum F' and fastened to it, so as to be wound up in the same sense as the winding-rope C'. When in this case the load to be borne, for instance, by the drum F increases during the descent of cage A in consequence of the hanging part of rope C becoming longer, this increase will be counterbalanced directly by the decrease of length of the rope part D.

Instead of employing two separate suspension-ropes, E and E', arranged to be coiled on either drum F and F', these ropes may be united, as is shown by Fig. 3, so as to form a single rope, E E', which is connected with its ends to the two parts of the counterbalance-rope, while it is slung with one or more turns in such a sense around one of the drums that the part D of the counterbalance-rope will be raised simultaneously with the cage A and the part D', together with the cage B.

I claim as my invention—

1. In a winding apparatus for mines, the combination, with the counterbalance rope or chain D D', of the suspension rope or ropes E E', passing over sheaves G G', and attached to the rope or chain D D' while being brought in relation to a movable portion of the apparatus adapted to draw upon the suspension-rope attached to the part of the rope or chain D D' which is to be raised, substantially as and for the purpose described.

2. The combination, with the counterbalance rope or chain D D', of the suspension-ropes E and E', passing over the sheaves G and G', and attached with one of their ends to the rope or chain D D', and with their other ends respectively to the top of the cages B and A, substantially as hereinbefore specified.

In testimony whereof I have signed my name to this specification in the presence of two subscribing witnesses.

ARTHUR LINDENBERG.

Witnesses:
SAMUEL SPACKMANN,
TH. PEITMANN.